United States Patent
Won et al.

(10) Patent No.: US 9,722,670 B2
(45) Date of Patent: Aug. 1, 2017

(54) WIRELESS POWER TRANSMISSION NETWORK AND WIRELESS POWER TRANSMISSION METHOD

(71) Applicant: INTELLECTUAL DISCOVERY CO., LTD., Seoul (KR)

(72) Inventors: Yunjae Won, Yongin-si (KR); Seungok Lim, Seongnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 169 days.

(21) Appl. No.: 14/414,618

(22) PCT Filed: Jul. 31, 2013

(86) PCT No.: PCT/KR2013/006895
§ 371 (c)(1),
(2) Date: Jan. 13, 2015

(87) PCT Pub. No.: WO2014/021636
PCT Pub. Date: Feb. 6, 2014

(65) Prior Publication Data
US 2015/0171931 A1 Jun. 18, 2015

(30) Foreign Application Priority Data

Jul. 31, 2012 (KR) .................. 10-2012-0083853
Jul. 31, 2012 (KR) .................. 10-2012-0084161
Jul. 31, 2012 (KR) .................. 10-2012-0084232

(51) Int. Cl.
*H02J 7/00* (2006.01)
*H04B 5/00* (2006.01)
(Continued)

(52) U.S. Cl.
CPC .......... *H04B 5/0037* (2013.01); *H01F 38/14* (2013.01); *H02J 5/005* (2013.01); *H02J 7/025* (2013.01);
(Continued)

(58) Field of Classification Search
CPC .... H01F 2038/143; H01F 38/14; H02J 17/00; H02J 5/005; H02J 7/025; H04B 5/0037; Y10T 307/406
See application file for complete search history.

(56) References Cited

U.S. PATENT DOCUMENTS 8,406,165 B2 * 3/2013 Won .................. H04L 1/1607
370/324
2009/0286475 A1 11/2009 Toncich et al.
(Continued)

FOREIGN PATENT DOCUMENTS

KR 10-2011-0099485 A 9/2011
KR 10-2011-0134970 A 12/2011
KR 10-2012-0005113 A 1/2012

OTHER PUBLICATIONS

International Search Report for PCT/KR2013/006895 dated Nov. 26, 2013 [PCT/ISA/210].

*Primary Examiner* — Vuthe Siek

(57) ABSTRACT

The present invention relates to a wireless power transmission network and to a wireless power transmission method. In the wireless power transmission method according to one aspect of the present invention, a base station, which wirelessly transmits power using a magnetic field, performs in-band communication through the magnetic field used for wireless power transmission in order to determine whether an electronic device receiving power is in a charging area or in a communication area, and transmits wireless power accordingly.

12 Claims, 14 Drawing Sheets

(51) Int. Cl.
*H02J 5/00* (2016.01)
*H02J 7/02* (2016.01)
*H01F 38/14* (2006.01)
*H02J 17/00* (2006.01)

(52) U.S. Cl.
CPC ......... *H01F 2038/143* (2013.01); *H02J 17/00* (2013.01); *Y10T 307/406* (2015.04)

(56) References Cited

U.S. PATENT DOCUMENTS

2010/0248622 A1* 9/2010 Lyell Kirby ......... H04B 5/0031
455/41.1
2011/0081857 A1 4/2011 Lee et al.

* cited by examiner

WIRELESS POWER TRANSMISSION NETWORK AND WIRELESS POWER TRANSMISSION METHOD

CROSS REFERENCE TO RELATED APPLICATIONS

This application is a National Stage of International Application No. PCT/KR2013/006895, filed on Jul. 31, 2012, which claims priority from Korean Patent Application Nos. 10-2012-0084232, 10-2012-0084161, and 10-2012-0083853, filed on Jul. 31, 2012, the contents of all of which are incorporated herein by reference in their entirety.

BACKGROUND OF THE INVENTION

Field of the Invention

The present invention relates to a wireless power transfer network and a wireless power transmission method and, more particularly, to a wireless power transfer network for wirelessly transferring power by using a magnetic field and performing in-band communication through a magnetic field used for wireless power transmission and a wireless power transmission method using the same.

Related Art

A wireless power transmission technique is a technique of transferring power between a power source and an electronic device without a line or a contact, which is anticipated to be utilized in various fields including home appliances, medical treatment, leisure, robots, automobiles, and the like.

The wireless power transmission technique is classified as inductive coupling and resonant magnetic coupling.

Inductive coupling is a scheme of transferring energy by inducing a current through a magnetic field from one coil to another coil using electromagnetic induction, and recently, a non-contact charging system using inductive coupling using inductive coupling has been utilized in electric toothbrushes, wireless razors, and the like.

Inductive coupling, however, is so vulnerable to a distance between two coils or relative positions thereof that transmission efficiency of inductive coupling is drastically degraded if two coils become away a little further or deviate. Thus, a non-contact charging system using inductive coupling has a restriction in that a charging distance is limited only to a fixed point of a few centimeters.

In contrast, resonant magnetic coupling uses a principle that two resonators having the same frequency tend to be coupled to each other, excluding other non-resonators around. Having an advantage of transferring energy farther, relative to existing inductive coupling, resonant magnetic coupling has come to prominence as a next-generation wireless power transmission technique.

SUMMARY OF THE INVENTION

An aspect of the present invention provides a wireless power transfer network and a wireless power transmission method, capable of selectively transferring power to an electronic device within a charging zone.

Another aspect of the present invention provides a wireless power transfer network and a wireless power transmission method, capable of effectively transferring power to a plurality of electronic devices.

Another aspect of the present invention provides a wireless power transfer network and a wireless power transmission method, capable of preferentially performing wireless power transmission on a device of high priority.

Technical subjects of the present invention are not limited to the foregoing technical subjects and any other technical subjects not mentioned will be clearly understood by a skilled person in the art from this disclosure and accompanying drawings.

According to an aspect of the present invention, a wireless power transmission method, performed by a base station in a wireless power transfer network which performs wireless power transmission by using a magnetic field and in-band communication using the magnetic field, and includes the base station supplying power and at least one electronic device receiving power, may include: transmitting a first magnetic field signal to the at least one electronic device; receiving a second magnetic field signal including information regarding in which of a charging zone and a communication zone the at least one electronic device is included, from the at least one electronic device in response to the first magnetic field signal; and supplying power to an electronic device included in the charging zone, among the at least one electronic device, by using the magnetic field.

According to another aspect of the present invention, a wireless power transmission method, performed by a particular electronic device in a wireless power transfer network which performs wireless power transmission by using a magnetic field and in-band communication using the magnetic field and includes a base station supplying power and at least one electronic device receiving power, may include: receiving a first magnetic field signal from the base station; determining whether power transmission is available in consideration of characteristics of the first magnetic field signal; transmitting a second magnetic field signal including information reflecting whether power transmission is available; and when power transmission is available, receiving power by using a magnetic field from the base station.

According to another aspect of the present invention, a wireless power transmission method, performed by a base station in a wireless power transfer network which performs wireless power transmission by using a magnetic field and in-band communication using the magnetic field, and includes the base station supplying power and at least one electronic device receiving power, may include: transmitting a first magnetic field signal to the at least one electronic device; receiving a second magnetic field signal including information regarding whether power transmission is available determined on the basis of characteristics of the first magnetic field signal from the at least electronic device; and supplying power to an electronic device available for power transmission among the at least one electronic device.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: recognizing the plurality of electronic devices through the in-band communication; splitting a power transmission interval into a plurality of time slots by using the recognition result, and allocating at least one electronic device to each time slot; and transferring power by using a magnetic field to an electronic device allocated to a corresponding time slot in each of the plurality of time slots during the power transmission interval.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: setting at least one group including electronic device with respect to the plurality of electronic devices; splitting a power transmission interval into a plurality of time slots and allocating at least one time slot to the at least one group; and transferring power by using a magnetic field to an electronic device belonging to a group allocated a corresponding time slot in the plurality of time slots during the power transmission interval.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: determining priority levels of the plurality of electronic devices; performing scheduling of at least one time slot by splitting a power transmission interval on the basis of the priority levels; and supplying power to the plurality of electronic devices by using the magnetic field.

According to the present invention, since a base station determines whether an electronic device is in a charging zone through in-band communication and allocates a time slot to an electronic device in the charging zone and does not allocate a time slot an electronic device which is not in the charging zone, wireless power transmission can be effectively performed.

Also, according to the present invention, since the base station obtains information regarding electronic devices through in-band communication, splits a power transmission interval into time slots, and allocates the time slots, power can be effectively transferred to a plurality of electronic devices.

Also, according to the present invention, priority levels of electronic devices are determined and power may be preferentially supplied to an electronic device having a higher priority level. Thus, since an electronic device which needs to be urgently charged can be first charged over other electronic devices, user convenience can be increased.

Advantages and effects of the present invention are not limited to the foregoing contents and any other technical effects not mentioned herein may be easily understood by a person skilled in the art from the present disclosure and accompanying drawings.

DESCRIPTION OF EXEMPLARY EMBODIMENTS

Figure 1:
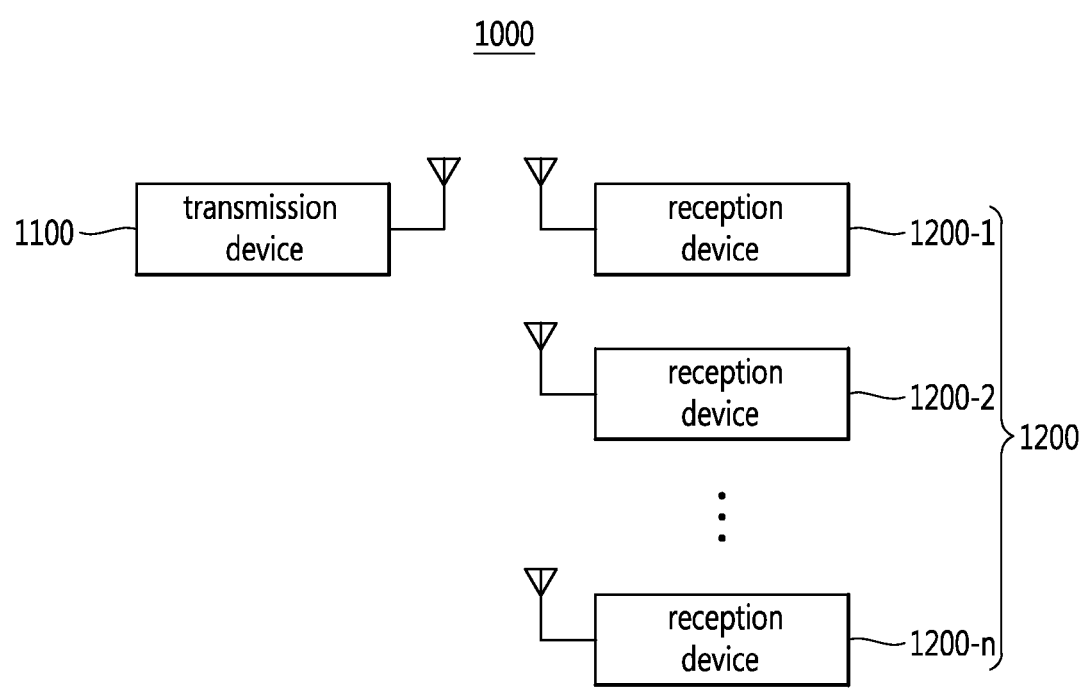
FIG. 1 is a view illustrating a configuration of a wirelessly transfer power system according to an embodiment of the present invention.

Embodiments described in this disclosure are provided to clarify the technical concept of the present invention for a person skilled in the art to which the present invention pertains, and thus, the present invention is not limited to the embodiments described in this disclosure and the scope of the present invention should be interpreted to include any modification without departing from the scope of the present invention.

The terms used in this disclosure and accompanying drawings help to describe the present invention easily, and the shapes illustrated in drawings are exaggerated for clarity, so the present invention is not limited by the terms used in this disclosure and the accompanying drawings.

If a detailed explanation for a related known function or construction is considered to unnecessarily divert the gist of the present invention, such explanation has been omitted but would be understood by those skilled in the art.

According to an aspect of the present invention, a wireless power transmission method, performed by a base station in a wireless power transfer network which performs wireless power transmission by using a magnetic field and in-band communication using the magnetic field, and includes the base station supplying power and at least one electronic device receiving power, may include: transmitting a first magnetic field signal to the at least one electronic device; receiving a second magnetic field signal including information regarding in which of a charging zone and a communication zone the at least one electronic device is included, from the at least one electronic device in response to the first magnetic field signal; and supplying power to an electronic device included in the charging zone, among the at least one electronic device, by using the magnetic field.

The at least one electronic device may determine in which of the charging zone and communication zone the at least one electronic device is included in consideration of characteristics of the first magnetic field signal.

In the supplying of power, power may be supplied to an electronic device included in the charging zone according to a time division scheme.

According to another aspect of the present invention, a wireless power transmission method, performed by a particular electronic device in a wireless power transfer network which performs wireless power transmission by using a magnetic field and in-band communication using the magnetic field and includes a base station supplying power and at least one electronic device receiving power, may include: receiving a first magnetic field signal from the base station; determining whether power transmission is available in consideration of characteristics of the first magnetic field signal; transmitting a second magnetic field signal including information reflecting whether power transmission is available; and when power transmission is available, receiving power by using a magnetic field from the base station.

The magnetic field used for the power supply may be provided as a frame structure having at least one time slot, the method further includes: when power transmission is available, receiving a third magnetic field signal including time slot allocation information from the base station, wherein, in the receiving of power, a coil for receiving power may be activated during an allocated time slot interval, and the coil may be deactivated during an unallocated time slot interval.

According to another aspect of the present invention, a wireless power transmission method, performed by a base station in a wireless power transfer network which performs wireless power transmission by using a magnetic field and in-band communication using the magnetic field, and includes the base station supplying power and at least one electronic device receiving power, may include: transmitting a first magnetic field signal to the at least one electronic device; receiving a second magnetic field signal including information regarding whether power transmission is available determined on the basis of characteristics of the first magnetic field signal from the at least electronic device; and supplying power to an electronic device available for power transmission among the at least one electronic device.

The characteristics of the first magnetic field signal may include at least one among strength, an amplitude, and a frequency of the first magnetic field signal.

The at least one electronic device may determine whether power transmission is available depending on whether power transferred by the first magnetic field signal is greater than a predetermined value.

The predetermined value may be a threshold value according to charge characteristics of the at least one electronic device.

The magnetic field used for the power supply may be provided as a frame structure having at least one time slot, the method may further include: allocating at least one time slot to an electronic device available for power transmission, wherein the supplying of power may include: supplying power to an electronic device allocated to a corresponding time slot in every time slot.

The wireless power transmission method may further include: transmitting time slot allocation information to the at least one electronic device, wherein the at least one electronic device may activate a coil receiving the magnetic field during an allocated time slot interval and deactivate the coil during an unallocated time slot interval.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: recognizing the plurality of electronic devices through the in-band communication; splitting a power transmission interval into a plurality of time slots by using the recognition result, and allocating at least one electronic device to each time slot; and transferring power by using a magnetic field to an electronic device allocated to a corresponding time slot in each of the plurality of time slots during the power transmission interval.

In the allocating of at least one electronic device, the power transmission interval may be split into a plurality of time slots and the plurality of time slots may be allocated by using characteristics of the plurality of electronic devices according to the recognition result.

In the allocating of at least one electronic device, electronic devices having similar characteristics, among the plurality of electronic devices, may be allocated to the same time slot.

The characteristics of the plurality of electronic devices may include at least one among a rated voltage, a battery state, types of electronic devices, locations of electronic devices, transmission efficiency, and a transmission gain.

The recognizing of the plurality of electronic devices may include: transmitting a requested packet as a magnetic field signal; receiving response packets transmitted as magnetic field signals from the plurality of electronic devices which have received the request packet; and recognizing the plurality of electronic devices on the basis of the received response packets.

The response packets may include information regarding the characteristics of the plurality of electronic devices, and in the allocating of at least one electronic device, the power transmission interval may be split into a plurality of time slots and the plurality of time slots may be allocated by using the information regarding the characteristics of the plurality of electronic devices.

The wireless power transmission method may further include: transmitting a request packet including the time slot allocation information, wherein each of the plurality of electronic devices may be activated during the allocated time slot and deactivated during an unallocated time slot by using the time slot allocation information.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: setting at least one group including electronic device with respect to the plurality of electronic devices; splitting a power transmission interval into a plurality of time slots and allocating at least one time slot to the at least one group; and transferring power by using a magnetic field to an electronic device belonging to a group allocated a corresponding time slot in the plurality of time slots during the power transmission interval.

The wireless power transmission method may further include: recognizing the plurality of electronic devices through the in-band communication, wherein, in the setting of a group, the at least one group may be set by using characteristics of the plurality of electronic devices according to the recognition result.

In the setting of a group, electronic devices having similar characteristics, among the plurality of electronic devices, may be set to the same group.

The characteristics of the plurality of electronic devices may include at least one among a rated voltage, a battery state, types of electronic devices, locations of electronic devices, transmission efficiency, and a transmission gain.

The wireless power transmission method may further include: transmitting a request packet including a group identifier indicating a specific group to an electronic device belonging to the specific group; and transmitting the time slot allocation information to the plurality of electronic devices, wherein the electronic device belonging to the specific group is activated during an allocated time slot and deactivated during an unallocated time slot on the basis of the group identifier and the time slot allocation information.

According to another aspect of the present invention, a wireless power transmission method, performed by a base station in a wireless power transfer network which performs wireless power transmission by using a magnetic field and in-band communication using the magnetic field, and includes the base station supplying power and a plurality of electronic devices receiving power, may include: determining priority levels of the plurality of electronic devices; performing scheduling of at least one time slot by splitting a power transmission interval on the basis of the priority levels; and supplying power to the plurality of electronic devices by using the magnetic field.

The wireless power transmission method may further include: transmitting a request packet requesting information of the plurality of electronic devices to the plurality of electronic devices by using the magnetic field; and receiving response packets with respect to the request packet from the plurality of electronic devices by using the magnetic field, wherein, in the determining of priority levels, the priority levels may be determined on the basis of the information of the plurality of electronic devices included in the response packets.

The information of the plurality of electronic devices included in the response packets may include at least one among a type of device, a rated voltage, a charge voltage, a battery state, transmission efficiency, a transmission gain, and a distance from the base station.

In the determining of priority levels, the priority levels may be determined on the basis of characteristics of the plurality of electronic devices including at least one among a type of device, a rated voltage, a charge voltage, a battery state, transmission efficiency, a transmission gain, and a distance from the base station.

The scheduling may be performed by splitting the power transmission interval into at least one time slot and allocating at least one of the plurality of electronic devices to each time slot.

In the scheduling, a length of the at least one time slot may be determined on the basis of the priority levels.

In the scheduling, a time length of a time slot allocated to an electronic device having a higher priority level may be determined to be longer than a time length of a time slot allocated to an electronic device having a lower priority level.

In the scheduling, the number of time slots allocated to a specific electronic device among the plurality of electronic devices may be determined on the basis of the priority levels.

In the scheduling, a large number of time slots may be allocated to an electronic device having a higher priority level, relative to an electronic device having a lower priority level.

In the scheduling, time slots may be scheduled such that an electronic device having a higher priority level monopolizes a time slot and several electronic devices having lower priority levels share a single time slot.

The wireless power transmission method may further include: transmitting a power transfer ready request packet including the time slot allocation information by using the magnetic field, wherein, in the supplying of power, power may be supplied to an electronic device allocated a corresponding time slot in the at least one time slot during the power transmission period by using the magnetic field.

The plurality of electronic devices may be activated in an allocated time slot and deactivated in an unallocated time slot during the power transmission interval.

The wireless power transmission method may further include: obtaining user input information; and calculating the priority levels according to the user input information.

The wireless power transmission method may further include: receiving, by the plurality of electronic devices, the user information, and receiving magnetic field signals including the user information from the plurality of electronic devices during an autonomous interval, wherein the autonomous interval may be an interval during which the plurality of electronic devices transmit the magnetic field signals even without a request from the base station.

Hereinafter, a wirelessly transfer power system 1000 according to an embodiment of the present invention will be described.

The wirelessly transfer power system 1000 may wirelessly transfer power by using a magnetic field, and perform in-band communication through the magnetic field used for power transmission.

Thus, the wirelessly transfer power system 1000 may wirelessly supply power to various electronic devices 2200 without using lines such as electric wires or power cables. Also, in case of supplying power to the plurality of electronic devices 220, the wirelessly transfer power system 1000 may perform communication to effectively supply power.

In the wirelessly transfer power system 1000, power transmission may be performed by resonant magnetic coupling. Resonant magnetic coupling is a wireless power transmission scheme using a phenomenon in which a receiver and a transmitter are coupled by resonance of a magnetic field and energy is transferred from the transmitter to the receiver. Resonant magnetic coupling is advantageous in that energy can be transferred to a distance, relative to the existing inductive coupling.

Meanwhile, a power transmission scheme of the wirelessly transfer power system 1000 is not limited to the resonant magnetic coupling, so the wirelessly transfer power system 1000 may also perform wireless power transmission using inductive coupling. However, hereinafter, wireless power transmission performed on the basis of resonant magnetic coupling will be described for the purposes of description.

In the wirelessly transfer power system 1000, communication may be performed using a magnetic field of a frequency band used in power transmission. Namely, the wirelessly transfer power system 1000 may perform power transmission and in-band communication together using a magnetic field of the same frequency band. Thus, the wirelessly transfer power system 1000 may perform in-band communication using transmission and reception modules for wireless power transmission as is, and thus, an extra communication module is not additionally required, enhancing economic efficiency and design convenience.

FIG. 1 is a view illustrating a configuration of the wirelessly transfer power system 1000 according to an embodiment of the present invention.

Referring to FIG. 1, the wirelessly transfer power system 1000 may include a transmission device 1100 and a reception device 1200. The transmission device 1100 supplies power, and the reception device 1200 receives power from the transmission device 1100 wirelessly. The reception device may be provided as a single or a plurality of reception devices 1200-1, 1200-2, . . . , 1200-n. Power transmission may be performed according to resonant magnetic coupling. Also, the transmission device 110 and the reception device 1200 may exchange information according to in-band communication using a magnetic field of a frequency band used for power transmission.

The transmission device 1100 may be provided as a fixed type device or a mobile device. The fixed type device may be, for example, a device installed on the ceiling or wall of an indoor area or in furniture such as a table, or the like, or a device installed to be implanted in an outdoor bus stop, a subway station, and the like, or a device installed in transportation such as vehicles, trains, and the like. The mobile transmission device 1100 may be formed as part of a mobile device having a portable weight or size or a device such as a cover of a notebook computer, or the like.

The reception device 1200 may be, for example, various electronic devices having a battery such as a mobile communication terminal, a smartphone, a portable terminal, a personal digital assistant (PDA), a portable media player (PMP), a Wibro terminal, a television, a 3D-TV, an IP-TV, a telematics terminal, a navigation terminal, a digital camera, a notebook computer, or an electric vehicle, and home appliances driven with wirelessly supplied power, instead of a power source cable.

Hereinafter, configurations of the transmission device 1100 and the reception device 120 according to an embodiment of the present invention will be described.

Figure 2:
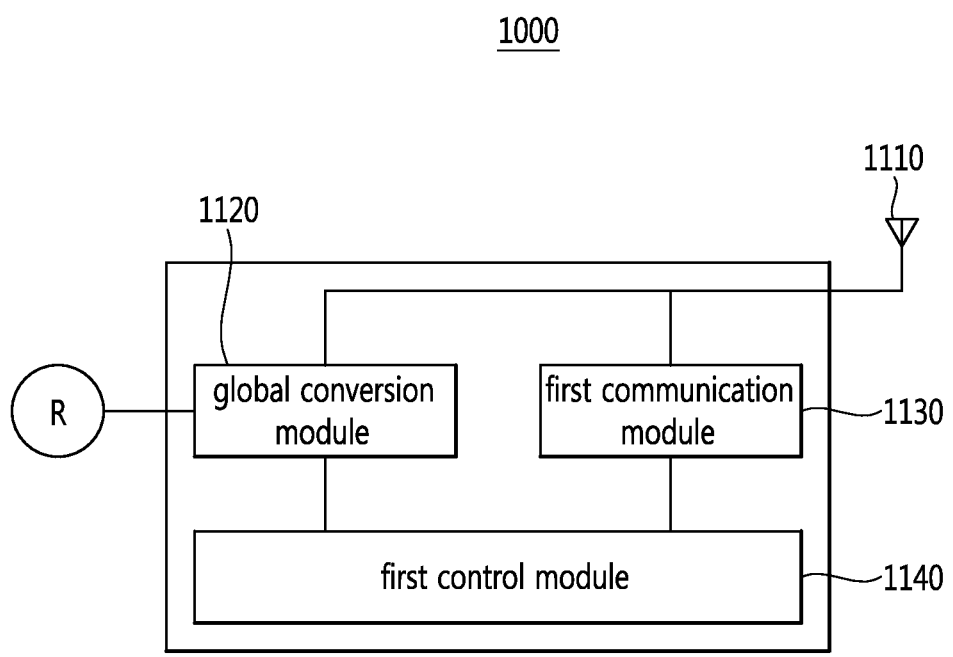
FIG. 2 is a view illustrating a configuration of a transmission device of FIG. 1.

FIG. 2 is a view illustrating a configuration of the transmission device 1100 of FIG. 1.

Referring to FIG. 2, the transmission device 1100 may include a power conversion module 1120, a first communication module 1130, a first antenna 1110, and a first control module 1140.

The power conversion module 1120 may convert power supplied from an external power source R into alternating current (AC) power of a resonance frequency band between the transmission device 1100 and the reception device 1200. The first communication module 1130 may perform signal processing to perform in-band communication with the reception device 1200 according to a magnetic field communication protocol. The first antenna 1110 may transmit power of the resonance frequency band converted by the power conversion module 1120 or a magnetic field signal processed by the first communication module 1130 or receive a magnetic field signal from the reception device 1200 using resonant magnetic coupling. Here, the first antenna 1110 may be formed as a pair of magnetic coils. The first control module 1140 may control components of the transmission device 1100.

Figure 3:
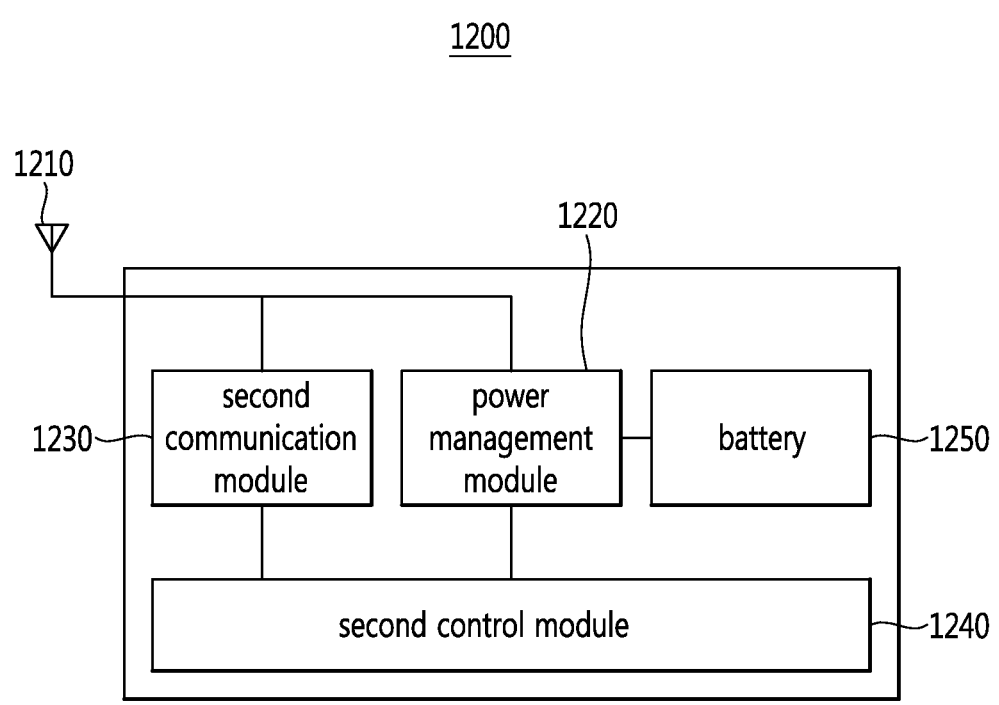
FIG. 3 is a view illustrating a configuration of a reception device of FIG. 1.

FIG. 3 is a view illustrating a configuration of the reception device 1200 of FIG. 1.

Referring to FIG. 3, the reception device 1200 may include a second communication module 1230, a second antenna 1210, a power management module 1220, a battery 1250, and a second control module 1240.

The second communication module 1230 may perform signal processing to perform in-band communication with the transmission device 1100 according to a magnetic field communication protocol. The second antenna 1210 may receive a magnetic field signal, power, from the transmission device 1100 or transmit a magnetic field signal processed by the second communication module 1230 using resonant magnetic coupling. Here, the second antenna 1210 may be formed as a pair of magnetic coils. The power management module 1220 manages power supplied from the transmission device 1100. For example, the power management module 1220 may convert supplied power into a direct current (DC) and supply the same to the battery 1250. The battery 1250 may store supplied power. The second control module 1240 may control the components of the reception device 1200.

Meanwhile, the battery 1250 is not necessarily included in the reception device 1200. For example, the battery 1250 may be provided as an external component that can be detachably attached to the reception device 1200. In another example, the reception device 1200 may include various driving units, instead of the battery 1250, and drive the driving units using supplied power to perform various functions.

In addition, the transmission device 1100 and the reception device 1200 may further include an input interface for receiving an input from a user or an output interface such as a display or a speaker.

Hereinafter, a wireless power transfer network 2000 according to an embodiment of the present invention will be described.

A wireless power transfer network (WPTN) 2000 is a network wirelessly transferring power by using a magnetic field and performs in-band communication by using the magnetic field used for power transmission, which may be implemented by using the wirelessly transfer power system 1000 described above.

For example, the WPTN 2000 may transfer power using a magnetic field having a low frequency band ranging from about 30 KHz to 300 KHz as an operating frequency hand and 128 KHz as an operating center frequency, and transmit and receive information by using the magnetic field having the same frequency band. As a modulation scheme, a binary phase shift keying (BPSK)) or amplitude shift keying (ASK) may be used. As a coding scheme, Manchester coding or non-return-to-zero level (NZR-L) coding may be used. The WPTN 2000 may provide a data rate of a few kbps to a distance as far as a few meters.

Meanwhile, the operating frequency band, the modulation scheme, and the coding scheme of the WPTN 2000 are not limited to the foregoing examples.

Figure 4:
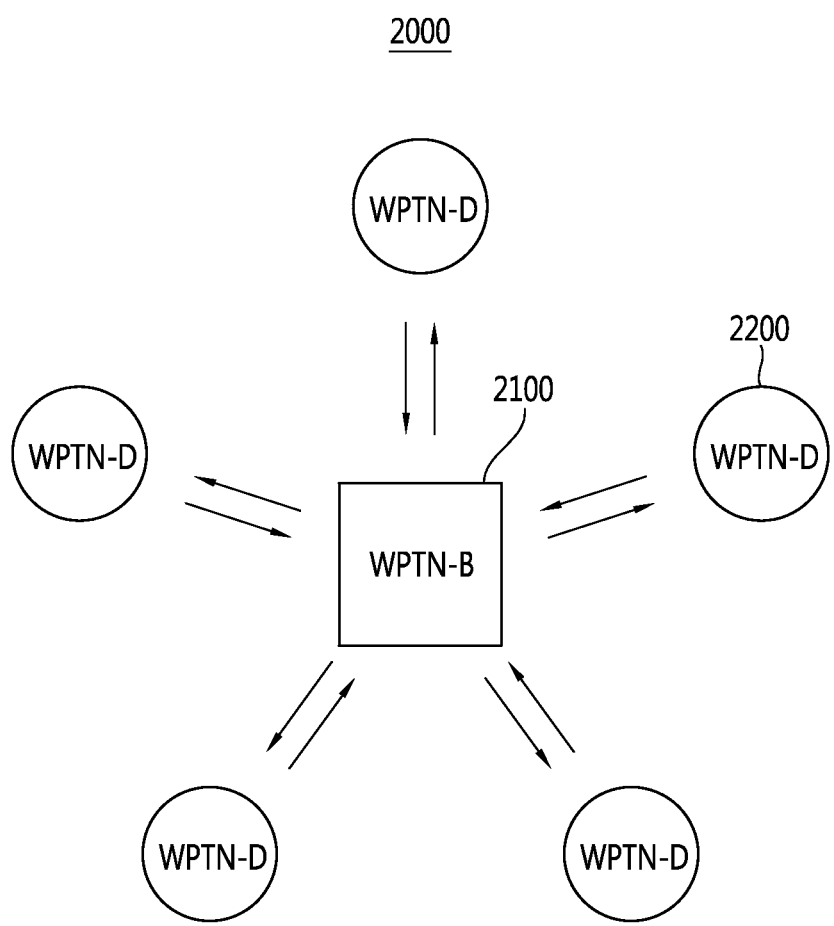
FIG. 4 is a view illustrating a configuration of a wireless power transfer network according to an embodiment of the present invention.

FIG. 4 is a view illustrating a configuration of the WPTN 2000 according to an embodiment of the present invention.

Referring to FIG. 4, the WPTN 2000 may be formed by various devices. The devices form nodes of the WPTN 2000, and here, the nodes may be classified as a base station node (a wireless power transfer network base station (WPTN-B)) 2100, and an electronic device node (a wireless power transfer network device (WPTN-D)) 2200 depending on functions thereof.

In the WPTN 2000, only a single base station node 2100 may exist, and one or a plurality of electronic device nodes 2200 may be provided. When the WPTN 2000 is configured, the base station node 2100, among the nodes constituting the WPTN 2000, may be first determined, and the other remaining nodes may be determined as the electronic device nodes 2200 subsequently. Here, the base station node 2100 may correspond to the transmission device 1100 of the wireless power transfer system 1000 described above, and the electronic device node 2200 may correspond to the reception device 1200 of the wireless power transfer system 1000.

The base station 2100 may wirelessly transfer power to the electronic device 2200. Also, the base station 2100 may manage the WPTN 2000. For example, the base station 2100 may set or release the WPTN 200 or connect or disconnect the electronic device node 2200. In another example, the base station 2100 may perform scheduling for wireless power transmission or in-bane communication.

The electronic device 2200 may receive power from the base station 2100. Also, the electronic device 220 may perform in-band communication with the base station 2100.

The WPTN 2000 may be physically divided into a charging zone Zp and a communication zone Zc.

The charging zone Zp refers to an area in which the electronic device 2200 may possibly receive power from the base station 2100. Of course, the electronic device 2200 in the charging zone Zp may also perform in-band communication with the base station 2100. The communication zone Zc refers to an area in which magnetic field communication may be possibly performed between the electronic device 2200 and the base station 2100, but it is not possible to supply power.

In order for the electronic device 2200 to charge the battery 1250 or in order for the electronic device 2200 to be driven using power supplied through a magnetic field, supplied power should be greater than a threshold value, and if not, the battery 1250 cannot be charged or the electronic device 2200 cannot be driven. In contrast, magnetic field communication does not have such constraints or has less constraints if any. In wireless power transmission using a magnetic field, an amount of transmitted power decreases according to distances, and as a result, a range available for power transmission in the WPTN 2000 is smaller than a range available for magnetic field communication.

In other words, the charging zone Zp refers to an area in which the electronic device 2200 therein may normally transmit and receive a communication packet to and from the base station 2100 by using a magnetic field, and may normally receive a magnetic field signal for wireless power transmission and charge the battery 1250 or drive a driving unit as well. Also, the communication zone Zc refers to an area in which the electronic device 2200 therein may normally transmit and receive a communication packet but cannot normally receive a magnetic field signal for wireless power transmission, or even if the electronic device 2200 receives a magnetic field signal, it cannot charge the battery 1250 or drive a driving unit by using the received magnetic field signal.

The electronic device 2200 may determine to which of the charging zone Zp and the communication zone Zc it belongs on the basis of a magnetic field signal received from the base station 2100. In detail, the electronic device may determine whether power transmission for charging the battery 1250 or driving a driving unit may be normally performed on the basis of characteristics of the magnetic field signal. Here, the characteristics of the magnetic field signal may include at least one among strength, an amplitude, and a frequency of the received magnetic field signal.

For example, the electronic device 2200 may determine whether electric energy supplied through the magnetic field signal is equal to or greater than a predetermined value in consideration of the characteristics of the magnetic field signal. When the electric energy is equal to or greater than the predetermined value, the electronic device 2200 determines that normal power transmission is available and that the electronic device 2200 is included in the charging zone Zp, and when the electric energy is smaller than the predetermined value, the electronic device 2200 determines that normal power transmission is not available and that the electronic device 2200 is included in the communication zone Zc. Here, in order to charge the battery 1250, power equal to or greater than a threshold value according to the characteristics of the battery 1250 should be supplied, and here, the predetermined value may be a threshold value such as rated power for charging the battery 1250 or for driving at the minimum.

In another example, the electronic device 2200 may determine whether wireless power is normally supplied in consideration of at least one among transmission efficiency and a transmission gain of wireless power transmission according to the received magnetic field signal received by the electronic device 2200 and a reception voltage and a reception current of the magnetic field signal received by the electronic device 2200.

Here, transmission efficiency may be a ratio of reception power of the electronic device 2200 to transmission power of the base station 2100. The electronic device 2200 may detect reception power on the basis of reception voltage information and reception current information. The reception voltage and the reception current may be performed by the second control module 1240 or the power management module 1220.

Also, a transmission gain may be a ratio of a reception voltage of the reception power of the electronic device 2200 to a transmission voltage of the base station 2100. For example, the electronic device 2200 may determine whether wireless power transmission may be normally performed depending on whether the reception voltage is greater or smaller than a predetermined value. Here, the predetermined value may be determined according to charge voltages, battery standards, design values of manufacturers, and the like.

Figure 5:
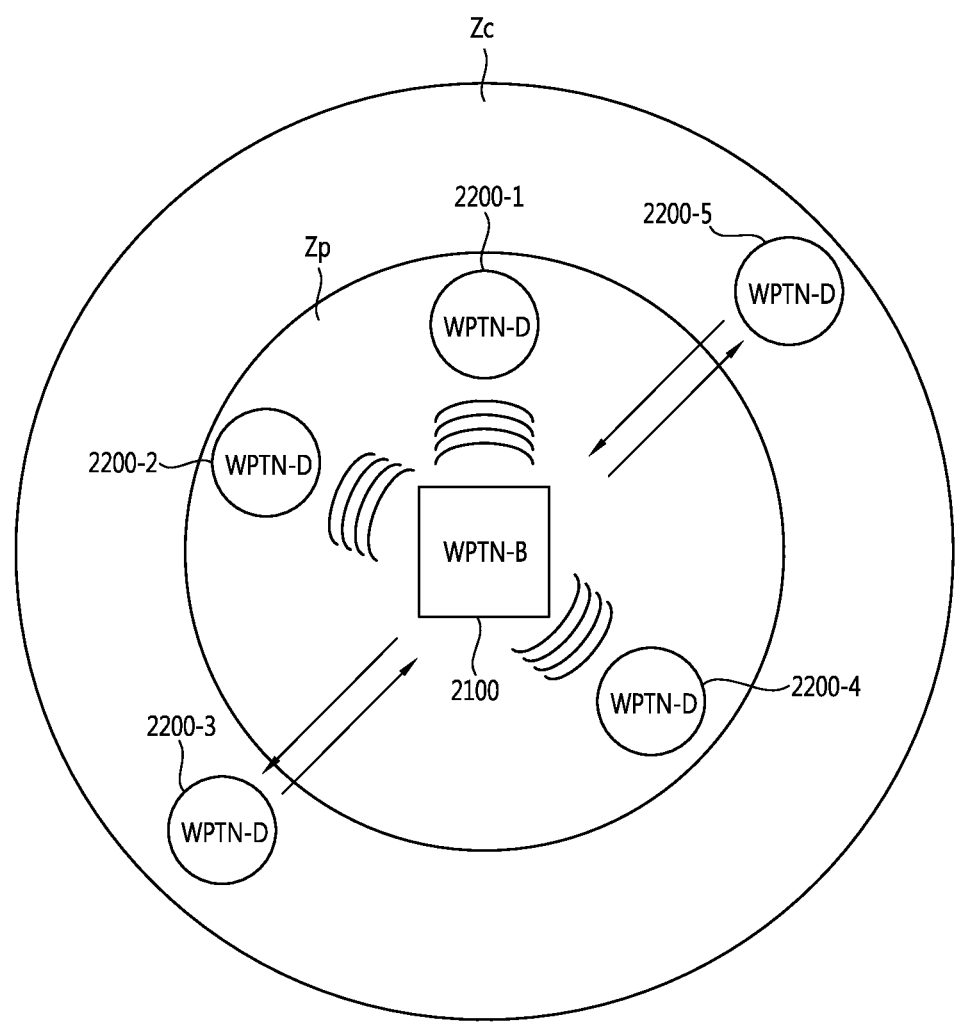
FIG. 5 is a view illustrating a charging zone and a communication zone of the wireless power transfer network of FIG. 4.

FIG. 5 is a view illustrating the charging zone Zp and the communication zone Zc of the WPTN 2000 of FIG. 4. In FIG. 5, it is illustrated that some electronic devices 2200-1, 2200-2, and 2200-4, among the electronic devices 2200, are included in the charging zone Zp, and the other electronic devices 2200-3 and 2200-5 are included in the communication zone Zc. However, in FIG. 5, it is illustrated that the charging zone Zp and the communication zone Zc are spatially accurately demarcated, but in actuality, the charging zone Zp and the communication zone Zc may change according to characteristics of the electronic device 2200, and thus, even the same location may be the charging zone Zp for a specific electronic device 2200 or the communication zone Zc for a different electronic device 2200.

Meanwhile, although the charging zone Zp is named, the electronic device 2200 present in the charging zone Zp does not necessarily use supplied power only to charge the battery 1250 but use supplied power to drive the electronic device 2200.

In the WPTN 2000, wireless power transmission and in-band communication may be performed using a superframe structure. The superframe structure is a frame applying time division multiple access (TDMA), and the use of the superframe structure is advantageous in that power can be supplied to a plurality of electronic devices 2200.

Hereinafter, the superframe structure according to an embodiment of the present invention will be described.

Figure 6:
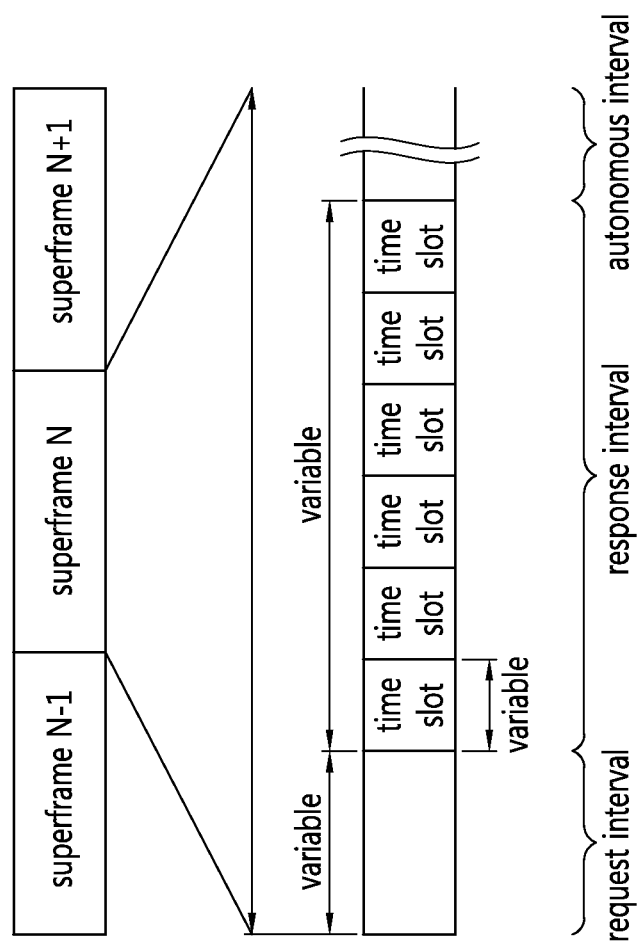
FIG. 6 is a view illustrating a configuration of a superframe according to an embodiment of the present invention.

FIG. 6 is a view illustrating a configuration of a superframe according to an embodiment of the present invention.

Referring to FIG. 6, a superframe includes a request interval, a response interval, and an autonomous interval.

The request interval, the response interval, and the autonomous interval may be disposed sequentially over time. Thus, the superframe may start from the request interval, passing through the response interval, and terminate with the autonomous interval. Here, time lengths of the request interval and the response interval may be variably adjusted.

During the request interval, the base station 2100 may transmit a request packet to the electronic device 2200. For example, the base station 2100 may broadcast a packet for setting the WPTN 2000 during the request interval. In another example, the base station 2100 may transmit a packet requesting connection to or disconnection from the WPTN 2000 to the electronic device 2200 during the request interval.

During the response interval, the electronic device 2200 may transmit a response packet to the base station 2100. Also, in case of power transmission, the base station 2100 may transmit power to the electronic device 2200 during the response interval. If there is no electronic device 2200 to respond or to receive power, the response interval may not exist.

During the autonomous interval, the electronic device 2200 may autonomously transmit information to the base station 2100 without a request from the base station 2100. The autonomous interval may start from a point in time at which transmission of a response packet or power transmission terminates or when a predetermined period of time has lapsed from the point of time of termination. The autonomous interval may terminate when the base station 2100 transmits a request packet. For example, during the autonomous interval, the electronic device 2200 may transmit a corresponding packet to the base station 2100 according to a system interrupt such as an input from the user.

Referring back to FIG. 6, the response interval may be split into time slots. The time slot may be one or a plurality of time slots, and a length of each time slot may be variable. The base station 2100 may split the response interval into time slots, and allocate a time slot to the electronic device 2200. Also, the base station 2100 may determine a length of each time slot. Splitting the response interval into time slots and allocation of the time slots to the electronic device 2200 may dynamically change in every superframe.

Splitting the response interval into time slots and allocation of the time slots to the electronic device 2200 may be performed according to a priority level of the electronic device 2200. For example, a large number of time slots may be allocated to an electronic device 2200 having a higher priority level, relative to an electronic device 2200 having a lower priority level. In another example, a time slot allocated to the electronic device 2200 having a higher priority level may have a time length longer than a time slot allocated to the electronic device 2200 having a lower priority level. Thus, the electronic device 2200 having a higher priority level may preferentially receive power.

During the response interval, the electronic device 2200 may use an allocated time slot. For example, the electronic device 2200 may transmit a response packet to the base station 2100 during the allocated time slot. In another example, when the base station 2100 transmits power, the electronic device 2200 may receive power from the base station 2100 during the allocated time slot.

The WPTN 2000 may effectively perform wireless power transmission in a case where a plurality of electronic device nodes 2200 are present in the WPTN 2000 by using the superframe having the response interval split into time slots.

Hereinafter, a wireless power transmission method according to an embodiment of the present invention will be described.

The wireless power transmission method will be described using the wireless power transfer system 1000, the WPTN 2000, and the superframe described above. However, the wireless power transmission method is not limited thereto and may be performed by any other system, network, and frame similar thereto.

Also, in the wireless power transmission method described hereinafter, it may be understood that a step performed by the base station node 2100 is performed by the first control module 1140 of the transmission device 1100 corresponding to the base station 2100, and a step performed by the electronic device node 2200 is performed by the second control module 1240 of the reception device 1200 corresponding to the electronic device 2200.

The first control module 1140 and the second control module 1240 may be formed as computer or a device similar thereto by using hardware, software, and combinations thereof.

By hardware, the first control module 1140 and the second control module 1240 may be formed as a application specific integrated circuit (ASIC), a digital signal processor (DSP), a digital signal processing device (DSPD), a programmable logic device (DSP), a field programmable gate array (FPGA), a printed circuit board (PCB), an integrated circuit (IC), a processor, a microprocessor, a controller, and any electrical unit performing a control function similar to that of these components.

Also, by software, the first control module 1140 and the second control module 1240 may be formed as a software code or a software application written in one or more program languages. Software may be executed by hardware.

Hereinafter, a wireless power transmission method according to an embodiment of the present invention will be described.

Figure 7:
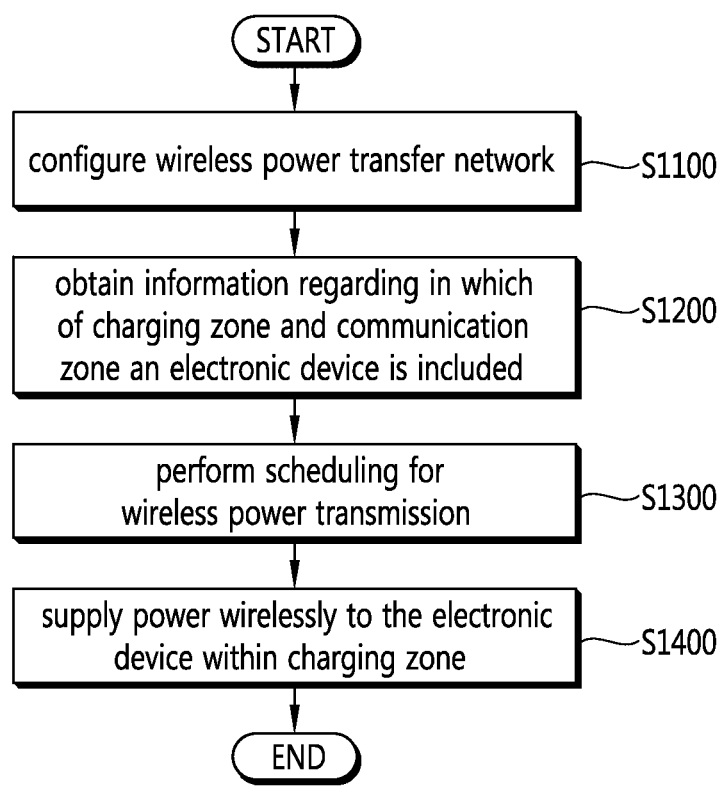
FIG. 7 is a flow chart illustrating a wireless power transmission method according to an embodiment of the present invention.

FIG. 7 is a flow chart illustrating a wireless power transmission method according to an embodiment of the present invention.

Referring to FIG. 7, the wireless power transmission method may include a step (S1100) of configuring a wireless power transfer network (WPTN) 2000, a step (S1200) of obtaining information regarding in which of a charging zone Zp and a communication zone Zc the electronic device 2200 is included, a step (S1300) of performing scheduling for wireless power transmission, and a step (S1400) of wirelessly supplying power to the electronic device 2200.

Hereinafter, the foregoing steps will be described in detail.

First, the WPTN 2000 is configured (S1100).

Figure 8:
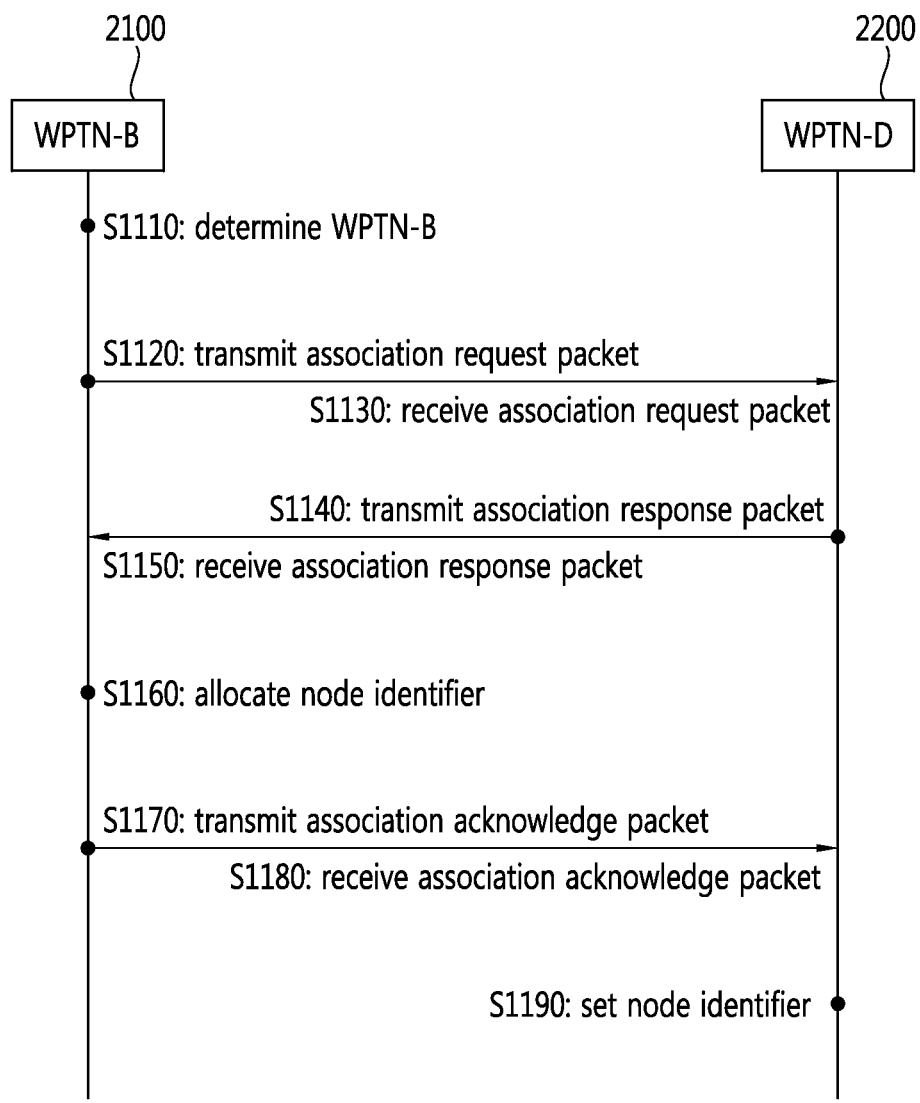
FIG. 8 is a detailed flow chart illustrating a step of configuring a wireless power transfer network of FIG. 7.

FIG. 8 is a detailed flow chart illustrating the step (S1100) of configuring the WPTN 2000 of FIG. 7.

Referring to FIG. 8, the base station 2100, among devices within a range configuring the WPTN 2000, is determined (S1110). Here, a device corresponding to the transmission device 1100 among the devices within the range may be determined as the base station 2100. Even in a case where a plurality of transmission devices 1100 are present within the range, only a single transmission device 1100 may be determined as a base station 2100. When the base station 2100 is determined, the other devices are determined as electronic device nodes 2200. Accordingly, the WPTN 2000 including the single base station 2100 and at least one electronic device 2200 may be configured.

When the WPTN 2000 is configured, the base station 2100 transmits an association request packet during the request interval of the superframe. (S1120) Here, the packet transmission may be performed in a broadcast manner. The association request packet may include a network identifier (a wireless power transfer network identifier (WPTN-ID) identifying the WPTN 2000. The network identifier may have a value unique to the WPTN 2000.

A device positioned within a reception range of a magnetic field transmitted by the base station 2100 receives the association request packet (S1130). Here, the reception range of the magnetic field may correspond to the communication zone Zc. Upon receiving the association request packet, the device may determine whether the base station 2100, which has transmitted the association request packet, is the base station 2100 of the WPTN 2000 with which the device intends to associate, on the basis of the network identifier.

Upon receiving the association request packet, the device may transmit an association response packet during the response interval as an electronic device node 2200 according to the determination result (S1140). The association response packet may include a unique identifier, a unique value allocated to the device by a manufacturer, or the like.

The base station 2100 receives the association response packet (S1150), and allocates a node identifier to each electronic device node 2200 (S1160). The base station 2100 transmits an association acknowledge packet to the electronic device node 2200 which has transmitted the association response packet (S1170). Here, the base station 2100 may identify the electronic device node 2200 by using the unique identifier included in the association response packet, and transmit the association acknowledge packet to the electronic device node 2200. The association acknowledge packet may include a node identifier allocated to each electronic device.

The electronic device 2200 receives the association acknowledge packet (S1180), and sets the allocated node identifier as a node identifier thereof (S1190). Accordingly, an address may be allocated to the base station node 2100 and the electronic device node 2200 and the WPTN 2000 may be configured.

When an address is allocated according to a node identifier in the WPTN 2000, the base station 2100 may transmit a request packet for recognition of the electronic device 2200 during the request interval.

So far, the step of configuring the WPTN 2000 is described with respect to a situation in which the WPTN 2000 is configured, but the present invention may also be applied to a situation in which an electronic device 2200, which has not associated, newly associates in a state in which the WPTN 2000 has already been configured.

When configuring the WPTN 2000 terminates, information regarding in which of the charging zone Zp and the communication zone Zc the electronic device 2200 is included is obtained (S1200).

Figure 9:
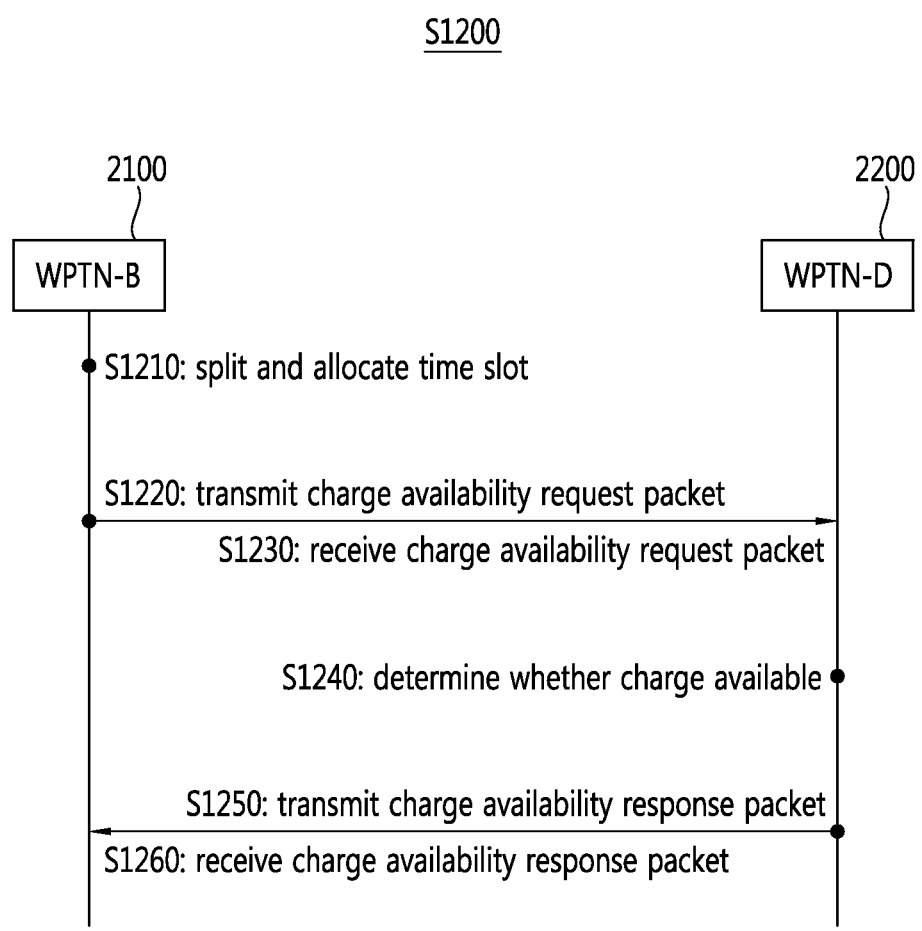
FIG. 9 is a detailed flow chart illustrating a step of obtaining information regarding in which of a charging zone and a communication zone an electronic device of FIG. 7 is included.

FIG. 9 is a detailed flow chart (S1200) illustrating a step of obtaining information regarding in which of the charging zone Zp and the communication zone Zc the electronic device 2200 of FIG. 7 is included.

Referring to FIG. 9, the base station 2100 splits the response interval of the superframe into time slots, and allocates each time slot to the electronic device 2200 (S1210). Here, the response interval may be split into the number of time slots equal to number of electronic devices 2200 such that the time slots and the electronic devices 2200 are matched in a one-to-one manner.

The base station 2100 transmits a charge availability request packet during the request interval of the superframe (S1220). The charge availability request packet is a packet requesting an electronic device 2200 to respond as to in which of the charging zone Zp and the communication zone Zc the corresponding electronic device 2200 is included. The charge availability request packet may include time slot allocation information indicating a time slot allocated to each electronic device 2200 by using a node identifier.

The electronic device 2200 receives the charge availability request packet (S1230). The electronic device 2200 determines to which of the charging zone Zp and the communication zone Zc the electronic device 2200 belongs on the basis of the received charge availability request packet (S1240). In detail, the electronic device 2200 may determine whether power transmission for charging the battery 1250 or driving a driving unit can be normally performed on the basis of characteristics of a magnetic field signal as a physical form of the charge availability request packet. Here, the characteristics of the magnetic field signal may include at least one among strength, an amplitude, and a frequency of the received magnetic field signal.

Upon determining whether normal power transmission is available or to which of the charging zone Zp and the communication zone Zc the electronic device belongs, the electronic device 2200 transmits a charge availability response packet as a response with respect to the charge availability request packet (S1250). The charge availability response packet may include information reflecting the determination result. Here, the electronic device transmits the charge availability response packet during a time slot allocated to the corresponding electronic device 2200 in the response interval according to the time slot allocation information included in the charge availability request packet. Accordingly, collision of response packets transmitted from the plurality of electronic devices in the base station 2100 can be prevented.

The base station 2100 may receive the charge availability response packet (S1260), and obtain information regarding in which of the charging zone Zp and the communication zone Zc the electronic device 2200 is included in the WPTN 2000 and whether power can be normally supplied.

When obtaining information terminates, the base station 2100 performs scheduling for wireless power transmission (S1300). The base station 2100 may schedule the response interval of the superframe for wireless power transmission by using the information included in the charge availability response packet.

The base station 2100 splits the response interval of the superframe into time slots, and allocates the electronic device 2200 which is included in the charging zone Zp or to which power can be normally transmitted, on the basis of the information included in the charge availability response packet. Compared with step S1210 in which a time slot is allocated to the electronic device 2200 without discriminating between the charging zone Zp and the communication zone Zc, a time slot is allocated only to the electronic device 2200 in the charging zone Zp in step S1300.

For example, referring to FIG. 5, in a case where five electronic devices 2200 are included in the WPTN 2000, the response interval is split into five time slots and each time slot is allocated to the electronic devices 2200 in step S1210. In contrast, in step S1300, the response interval is split into three time slots, and the three time slots may be allocated to three electronic devices 2200-1, 2200-2, and 2200-4 included in the charging zone Zp, among the five electronic devices 2200.

Accordingly, without wasting time to unnecessarily transmit power to the electronic device 2200 included in the communication zone Zc, power can be supplied only to the electronic device 2200 included in the charging zone Zp, and thus, power transmission can be effectively performed.

Meanwhile, in the foregoing example, the response interval is split into the number of time slots corresponding to the number of electronic devices 2200 in the charging zone Zp, and one electronic device 2200 is allocated to each time slot. Alternatively, the response interval may be split into a different number of time slots from the number of the electronic devices 2200 in the charging zone Zp or a plurality of electronic devices 2200 may be simultaneously allocated to a single time slot.

Power is wirelessly supplied to the electronic device 2200 in the charging zone Zp according to scheduling (S1400).

Figure 10:
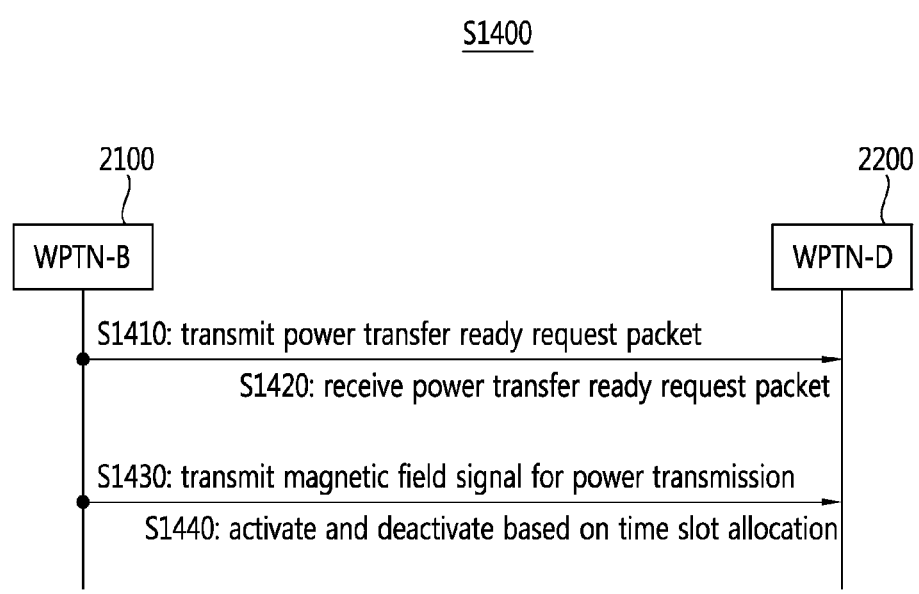
FIG. 10 is a detailed flow chart illustrating a step of wirelessly supplying power to an electronic device within a charging zone of FIG. 7.

FIG. 10 is a detailed flow chart illustrating step (S1400) of wirelessly supplying power to the electronic device 2200 within a charging zone of FIG. 7.

Referring to FIG. 10, the base station 2100 transmits a power transfer ready request packet during the request interval (S1410). The power transfer ready request packet may include time slot allocation information according to scheduling performed in step S1300.

The electronic device 2200 receives the charge ready request packet (S1420). The electronic device 2200 may determine a time slot allocated to the corresponding electronic device 2200 according to the received charge ready request packet.

The base station 2100 transmits a magnetic signal for power transmission to the electronic device 2200 which is in the charging zone Zp or which is available for normal power transmission during the response interval (S1430). Here, the magnetic signal transmitted during the specific time slot may have characteristics corresponding to the electronic device 2200 to receive power during the corresponding time slot. For example, the magnetic field signal transmitted during the specific time slot may be provided to have a rated voltage, current, or power, or charge voltage, current, and power of the electronic device 2200 which has been allocated the time slot. The characteristics of the magnetic field signal may be adjusted by the power conversion module 1120 of the transmission device 1100. Meanwhile, in order to adjust a magnetic field to have the characteristics corresponding to the electronic device 2200, the base station 2100 may obtain information regarding performance or characteristics of the electronic device 2200 from the electronic device 2200 by using the superframe structure. This may be performed in a manner similar to that of the foregoing step S1300.

During the response interval, the electronic device 2200 may be activated to receive power during the allocated time slot and deactivated not to receive power during an unallocated time slot (S1440).

Here, the activated state may be a state in which the electronic device 2200 may receive power from the base station 2100 according to resonant magnetic coupling, and the deactivated state may be a state in which the electronic device 2200 cannot receiver power. In detail, the base station 2100 may be activated by resonating the second antenna 1210 or a magnetic coil of the reception device 1200 with the base station 2100, and conversely, the electronic device 2200 may be deactivated by preventing resonation of the second antenna 1210 or the magnetic coil.

For example, the electronic device 2200 included in the communication zone Zc is not allocated a time slot, and thus, the electronic device 2200 may be deactivated during the entire response interval. In another example, the electronic device 2200 in the charging region Zp may be activated during the allocated time slot and may be deactivated during an unallocated time slot. In the case of performing wireless power transmission using the resonant magnetic coupling, each electronic device 2200 may operate as a resonator, and here, if a different electronic device 2200, other than the electronic device 2200 which needs to receive power, is activated, the different electronic device 2200 may unintentionally operate as a resonator, degrading power transmission efficiency. Thus, each electronic device 2200 is deactivated during an unallocated time slot, thus preventing interference to power transmission to the electronic device 2200 which has been allocated a time slot.

In this manner, the base station 2100 may supply power to the electronic device 2200 within the charging zone Zp during the response interval by using a magnetic field. Also, the base station 2100 may split the response interval into time slots and allocate the time slots to the electronic device 2200 within the charging zone Zp, thereby simultaneously transmitting power to the plurality of electronic devices 2200 during the one response interval.

Hereinafter, a wireless power transmission method according to another embodiment of the present invention will be described.

Figure 11:
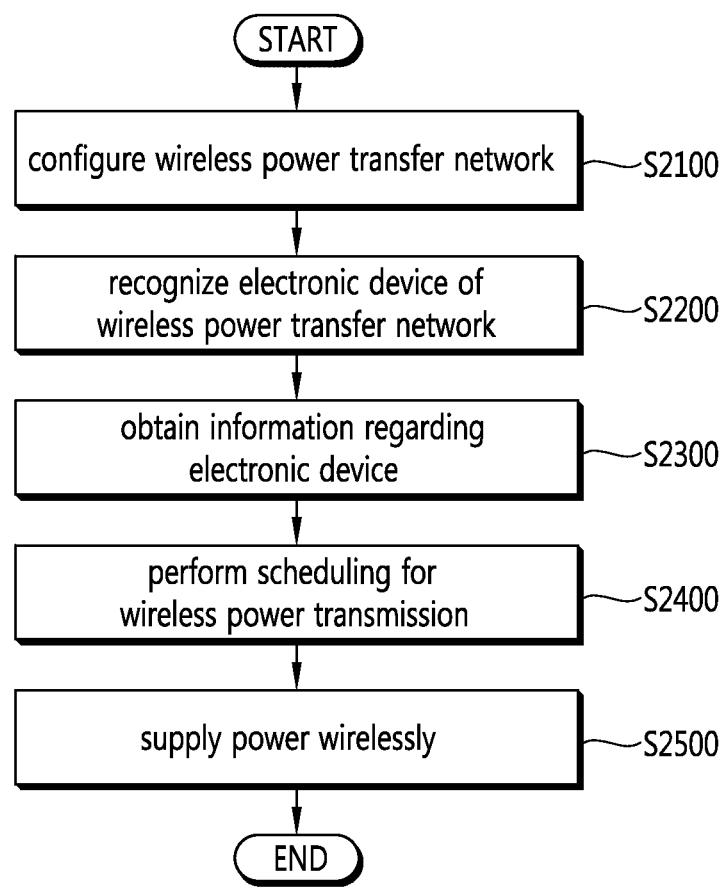
FIG. 11 is a flow chart illustrating a wireless power transmission method according to another embodiment of the present invention.

FIG. 11 is a flow chart illustrating a wireless power transmission method according to another embodiment of the present invention.

Referring to FIG. 11, the wireless power transmission method may include a step (S2100) of configuring a wireless power transfer network (WPTN) 2000, a step (S2200) of recognizing an electronic device 2200, a step (S2300) of obtaining information regarding the electronic device 2200, a step (S2400) of performing scheduling for wireless power transmission, and a step (S2500) of wirelessly supplying power.

Hereinafter, the foregoing steps will be described in detail.

First, the WPTN 2000 is configured (S2100). The step (S2100) of configuring the WPTN 2000 may be performed in a manner identical or similar to the step (S1100) of configuring the WPTN 2000 in the wireless power transmission method according to an embodiment of the present invention described above, and a detail description thereof will be omitted.

When configuring the WPTN 2000 is completed, the base station 2100 recognizes the electronic device 2200 (S2200).

In a case where the WPTN 2000 has not allocated a node identifier yet to the electronic device node 2200, the base station 2100 may recognize the electronic device 2200 through steps S1120 to S1190 described above with reference to FIG. 8, in step S2100. For example, the base station may receive an association response packet, and recognize the electronic device 2200 included in the WPTN 2000 according to a unique identifier included in the association response packet.

Here, the base station 2100 may recognize the electronic device 2200 through the foregoing scheme, but in general, the unique identifier has capacity greater than that of a node identifier, having constraints in use, and thus, after the node identifier is allocated, the node identifier, rather than the unique identifier, may be largely used as an address indicating the node.

When an address is allocated according to the node identifier in the WPTN 2000, the base station 2100 may transmit a request packet for recognition of the electronic device 2200 during the request interval.

When the electronic device 2200 receives the request packet, the electronic device 2200 may transmit a response packet with respect to the request packet, during the response interval. The response packet may include information for recognition of the electronic device 2200. For example, the response packet may include a node identifier of the electronic device 2200.

When the response packet is received, the base station 2100—may recognize the electronic device 2200 on the bass of the response packet. In detail, the base station 2100 may recognize a configuration of the electronic device node 2200 of the WPTN 2000.

The base station 2100 obtains information regarding the electronic device 2200 (S2300). The base station 2100 may transmit a request packet requesting information regarding the electronic device 2200 to the electronic device 2200 during the request interval. When the request packet is received, the electronic device 2200 may transmit a response packet regarding the information to the electronic device 2200 during the response interval. The response packet may include information regarding characteristics of the electronic device 2200. Here, the characteristics of the electronic device 2200 may include at least one among a rated voltage, a battery state, a type of the electronic device, a location of the electronic device, whether in which of the charging zone and the communication zone the electronic device is present, transmission efficiency, and a transmission gain.

The base station 2100 receives the response packet, and obtains information regarding the electronic device 2200. In this manner, the base station 2100 may obtain information regarding the electronic device 2200.

Meanwhile, in the above description, step S2200 and step S2300 are separately performed, but step S2200 and step S2300 may be performed simultaneously. For example, step S2200 and step S2300 may be performed by using a single superframe. That is, when the base station 2100 transmits the request packet and the electronic device 2200 transmits the response packet, the request packet is a packet recognizing the electronic device 2200 and requesting information of the electronic device 2200 and the response packet may be a packet including a node identifier of the electronic device 2200 and all of information of the electronic device 2200. In addition, the superframe used in steps S2200 and S2300 may be the superframe the same as the association request packet and the association response packet.

When obtaining information terminates, the base station 2100 performs scheduling for wireless power transmission (S2400).

The base station 2100 may schedule the response interval of the superframe for wireless power transmission by using the obtained information.

The base station 2100 may split the response interval of the superframe for power transmission into time slots, and allocates a time slot to the electronic device 2200 by using the recognition result of the electronic device 2200 and the information regarding the characteristics of the electronic device 2200. In detail, the base station 2100 may allocate electronic devices 2200 having similar characteristics, among the electronic devices 2200 recognized to be included in the WPTN 2000, to the same time slot.

For example, the base station 2100 may allocate electronic devices 2200 having a similar or identical rated voltage among the electronic devices 2200 present in the WPTN 2000, to the same time slot. In a specific example, in the WPTN 2000 including five electronic devices 2200, when two electronic devices 2200 have rated power of 5 W, two other electronic devices 2200 have a rated voltage of 7 W, and another remaining electronic device 2200 has a rated voltage of 3 W, the base station 2100 may split the response interval into three time slots, allocates the electronic devices 2200 having the rated voltage of 5 W, the electronic devices 2200 having the rated voltage of 7 W to one time slot, and the electronic device 2200 having the rated voltage of 3 W to the other remaining time slot.

In another example, the base station 2100 may allocate the electronic devices 2200 which are similar in type and which are adjacent to each other, among the electronic devices 2200, to the same time slot.

Also, in order to effectively perform charging, the base station 2100 may change lengths or the number of time slots. For example, in the WPTN 2000 including an electronic device 2200 having a low charge level of battery 1250 and an electronic device 2200 having a considerable charge level of battery 1250, the base station 2100 may allocate a larger number of time slots or a longer time slot to the electronic device 2200 which has a low charge level of battery 1250 requiring more power than to the electronic device 2200 which has a battery 1250 charged to a considerable level and thus requiring small power.

Also, the base station 2100 may not allocate a time slot to an electronic device 2200 which is outside of the charging zone or which has a fully charged battery 1250. For example, in a case where one electronic device 2200, among five electronic devices 2200, is included in the communication zone and two electronic devices 2200, among four electronic devices 2200 in the charging zone, have fully charged battery 1250, the base station 2100 may split the response interval into two time slots and allocate the two time slots to the electronic devices 2200 requiring charging, respectively.

Power is wirelessly supplied to the electronic device 2200 according to the scheduling (S2500).

Figure 12:
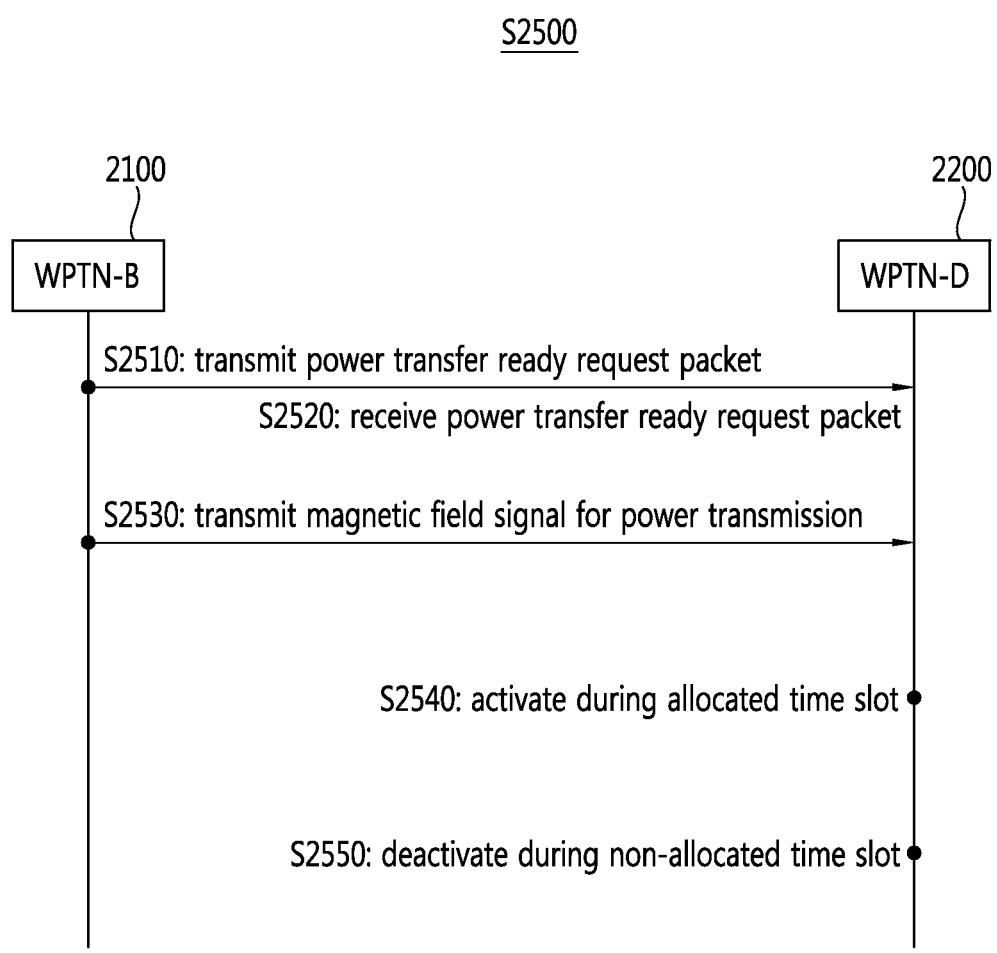
FIG. 12 is a detailed flow chart illustrating a step of wirelessly supplying power to an electronic device of FIG. 11.

FIG. 12 is a detailed flow chart illustrating a step (S2500) of wirelessly supplying power to the electronic device 2200 of FIG. 11.

Referring to FIG. 12, the base station 2100 transmits a power transfer ready request packet (or a charge ready request packet) during the request interval of the superframe (S2510). The power transfer ready request packet may include time slot allocation information according to scheduling performed in step S2400.

The electronic device 2200 receives the power transfer ready request packet (S2520). The electronic device 2200 may determine a time slot allocated to the corresponding electronic device 2200 according to the received power transfer ready request packet.

The base station 2100 transmits a magnetic field signal for power transmission to the electronic device 2200 (S2530). Here, the magnetic signal transmitted during the specific time slot may have characteristics corresponding to the electronic device 2200 to receive power during the corresponding time slot. For example, the magnetic field signal transmitted during the specific time slot may be provided to have a rated voltage, current, or power, or charge voltage, current, and power of the electronic device 2200 which has been allocated the time slot. The characteristics of the magnetic field signal may be adjusted by the power conversion module 1120 of the transmission device 1100 on the basis of the obtained information.

During the response interval, the electronic device 2200 may be activated to receive power during the allocated time slot (S2540) and deactivated not to receive power during an unallocated time slot (S2550).

In the case of performing wireless power transmission using the resonant magnetic coupling, each electronic device 2200 may operate as a resonator, and here, if a different electronic device 2200, other than the electronic device 2200 which needs to receive power, is activated, the different electronic device 2200 may unintentionally operate as a resonator, degrading power transmission efficiency. Thus, each electronic device 2200 is deactivated during an unallocated time slot, thus preventing interference to power transmission to the electronic device 2200 which has been allocated a time slot.

In this manner, the base station 2100 may supply power to the electronic device 2200 during the response interval by using a magnetic field. Also, the base station 2100 may split the response interval into time slots and allocate the electronic devices 2200 to the times slots on the basis of the recognition result of the electronic devices 2200 and the information regarding the electronic devices 2200, thereby effectively simultaneously transmitting power to the plurality of electronic devices 2200 during the one response interval.

Hereinafter, a modified example of a wireless power transmission method according to another embodiment of the present invention will be described.

Figure 13:
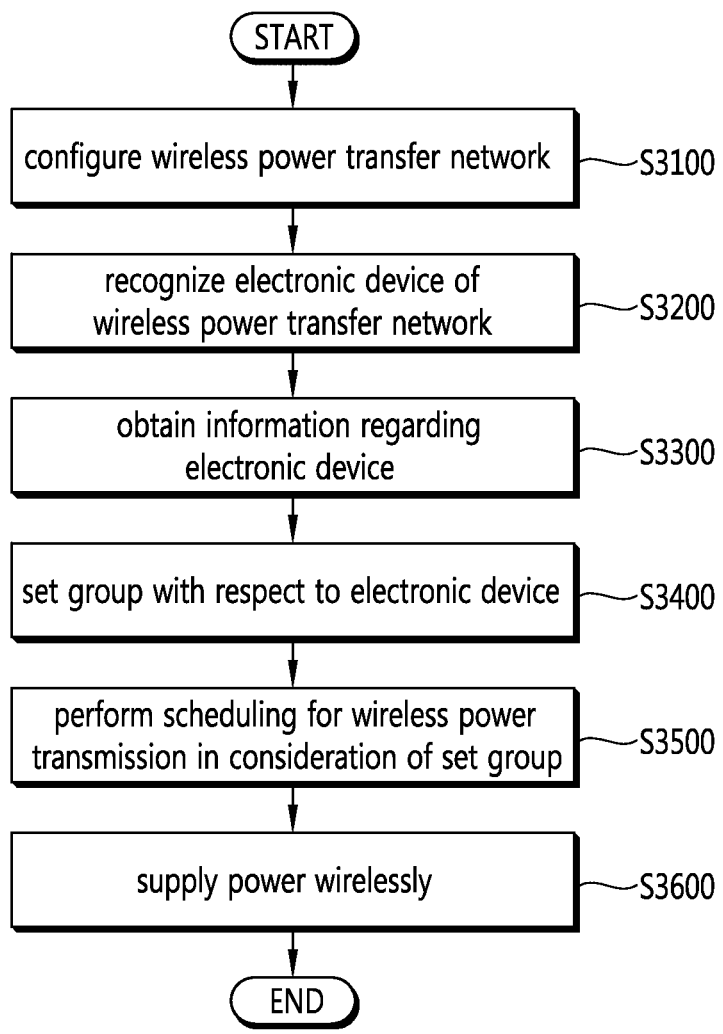
FIG. 13 is a flow chart illustrating a modified example of a wireless power transmission method according to another embodiment of the present invention.

FIG. 13 is a flow chart illustrating a modified example of a wireless power transmission method according to another embodiment of the present invention.

Referring to FIG. 13, the wireless power transmission method may include a step (S3100) of configuring a wireless power transfer network (WPTN) 2000, a step (S3200) of recognizing an electronic device 2200, a step (S3300) of obtaining information regarding the electronic device 2200, a step (S3400) of setting a group with respect to the electronic device 2200, a step (S3500) of performing scheduling to wirelessly transmit power in consideration of the set group, and a step (S3600) of wirelessly supplying power.

Hereinafter, the foregoing steps will be described in detail.

In the wireless power transmission method according to another embodiment of the present invention, steps S3100 to S3300 may be performed in a manner identical or similar to the steps S2100 to S2300 of the wireless power transmission method according to another embodiment of the present invention described above, and thus, a detailed description thereof will be omitted.

The base station 2100 sets a group with respect to electronic devices 2200 within the WPTN 2000 (S3400).

The base station 2100 may classify the electronic devices 2200 into a group including at least one electronic device 2200 by using the recognition result and the characteristics information. In detail, with respect to at least a portion of the electronic devices 2200, the base station 2100 may classify electronic devices 2200 having similar device characteristics, as the same group. This may be basically similar to the scheduling method in the wireless power supply method according to another embodiment of the present invention described above.

For example, the base station 2100 may set electronic devices 2200 having a similar or identical rated voltage, among the electronic devices 2200 present in the WPTN 2000, as the same group. In a specific example, in the WPTN 2000 including five electronic devices 2200, if two electronic devices 2200 have rated power of 5 W, two other electronic devices 2200 have a rated voltage of 7 W, and the other remaining one electronic device 2200 has a rated voltage of 3 W, the base station 2100 may set the electronic devices 2200 having the rated voltage of 5 W to a first group and the electronic devices 2200 having a rated voltage of 7 W to a second group. The other remaining one electronic device 2200 is single, and thus, it may be set to a third group or may not be set.

The base station 21000 may allocate a group identifier to each group. The group identifier is a value for identifying a group including at least one electronic device 2200.

When the group classification is set, the base station 2100 transmits a group designation request packet during the request interval. The group designation request packet may include group allocation information including a group identifier and a node identifier associated with the group identifier. The electronic device 2200 receives the group designation request packet and sets a group ID as its group identifier according to the group allocation information. Accordingly, group setting is completed.

When group setting terminates, the base station 2100 performs scheduling for wireless power transmission (S3400).

The base station 2100 may schedule the response interval of the superframe for wireless power transmission.

The base station 2100 may split the response interval of the superframe for power transmission into time slots, and allocate the group or individual electronic devices 2200 to each time slot.

For example, in the WPTN 2000 in which, among five electronic devices 2200, two electronic devices 2200 are classified as a first group, two other electronic devices 2200 are classified as a second group, and the other remaining one electronic device 2200 is not classified as a group, the base station 2100 may split the response interval into three time slots and allocate the first group to a first time slot, the second group to a second time slot, and the individual electronic device 2200 not belonging to a group to a third time slot.

The base station wirelessly supplies power to the electronic devices 2200 according to the scheduling (S3600). This step S3600 may be performed in a manner similar or identical to the step S2500 of the wireless power transmission method according to another embodiment of the present invention described above, and thus, a difference of the step S3600 from the step S2500 will be largely described.

The base station 2100 may transmit a power transfer ready request packet during the request interval of the superframe to provide scheduled contents to the electronic device 2200.

The base station 2100 may transmit a magnetic field signal for power transmission to the electronic device 2200, and the electronic device 2200 may receive power during the time slot allocated to the corresponding electronic device 2200. Here, in a case where a specific group is allocated to a specific time slot, all the electronic devices 2200 of the group may receive power simultaneously.

The electronic device 2200 is activated during the allocated time slot and deactivated during an unallocated time slot. In a case where a specific time slot is allocated to a specific group, all the electronic devices 2200 belonging to the specific group may be activated during the specific time slot. Accordingly, the base station 2100 may supply power to all the electronic devices 2200 that belong to the group.

Hereinafter, a wireless power transmission method according to another embodiment of the present invention will be described.

Figure 14:
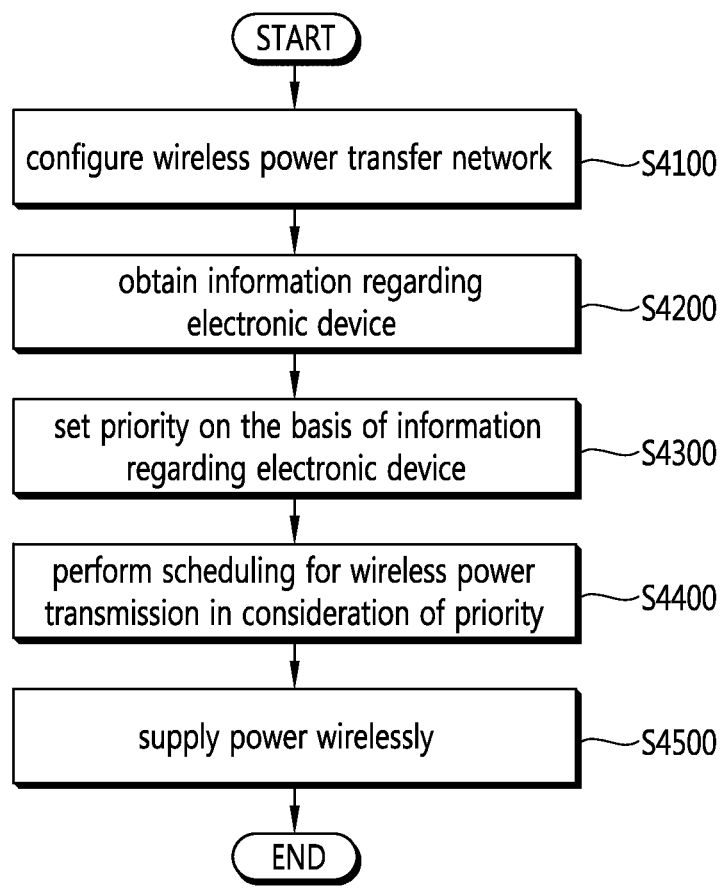
FIG. 14 is a flow chart illustrating a wireless power transmission method according to another embodiment of the present invention.

FIG. 14 is a flow chart illustrating a wireless power transmission method according to another embodiment of the present invention.

FIG. 14 is a flow chart illustrating a wireless power transmission method according to another embodiment of the present invention.

Referring to FIG. 14, a wireless power transmission method may include a step (S4100) of configuring a WPTN 2000, a step (S4200) of obtaining information regarding an electronic device 2200, a step (S4300) of setting a priority level on the basis of the information regarding the electronic device 2200, a step (S4400) of performing scheduling for wireless power transmission in consideration of the priority level, and a step (S4500) of wirelessly supplying power to the electronic device 2200.

Hereinafter, the steps will be described in detail.

First, a WPTN 2000 is configured (S4100). The step (S4100) of configuring the WPTN 2000 may be performed in a manner identical or similar to the step (S1100) of configuring the WPTN in the wireless power transmission method according to one embodiment of the present invention described above, and thus, a detailed description thereof will be omitted.

The base station 2100 obtains information regarding the electronic device 2200 (S4200). The base station 2100 may transmit a request packet requesting information regarding the electronic device 2200 to the electronic device 2200 during the request period. When the request packet is received, the electronic device 2200 may transmit a response packet regarding the information to the electronic device 2200 during a response period. The response packet may include the information regarding the electronic device 2200. Here, the information regarding the electronic device 2200 may include at least one among a device type, a rated voltage, a charge voltage, a battery state, transmission efficiency, and a transmission gain of the electronic device, a location of the electronic device 2200, and in which of the charging zone and the communication zone the electronic device 2200 is present.

The base station 2100 may receive the response packet and obtain the information regarding the electronic device 2200. Accordingly, the base station 2100 can obtain the information regarding the electronic device 2200.

Meanwhile, in the above description, step S4100 and step S4200 are separately performed, but step S4100 and step S4200 may be performed simultaneously. For example, step S4100 and step S4200 may be performed by using a single superframe. That is, an association request packet and a request packet requesting information from the electronic device 2200 may be simultaneously transmitted and received as the same packet. Also, an association response packet and a response packet including information of the electronic device 2200 may be simultaneously transmitted and received as the same packet.

When obtaining information terminates, a priority level may be set (S4300).

The base station 2100 may set a priority level of the electronic device 2200 on the basis of the obtained information. Here, the priority level may be a value indicating to which of electronic devices 2200 power is to be preferentially transmitted. For example, an electronic device 2200 requiring urgent charging should have a higher priority level and a electronic device 2200 having a fully charged battery may have a lower priority level.

The base station 2100 may set a priority level by evaluating the obtained information by using a predetermined algorithm.

The base station 2100 may determine a priority level of each electronic device 2200 in consideration of a device type, a battery state, a rated voltage, a charge voltage, a battery state, transmission efficiency, and a transmission gain of each electronic device 2200, a distance to the base station, and the like.

For example, the base station 2100 may evaluate an electronic device 2200 with a fully charged battery, as having a lower priority level. Conversely, as a capacity of a battery is smaller, the base station 2100 may evaluate an electronic device 2200 as having a higher priority level.

In another example, when a device type is a fixed type in a household, the device may have a lower priority level. Conversely, when a device type is a mobile type, like a cellular phone, the mobile device may be ranked to have a higher priority level.

Meanwhile, the electronic device 2200 may face a system interrupt such as a user input, or the like, and here, information regarding a priority level designated by the user may be included. The electronic device 2200 may provide the same to the base station 2100. Here, the electronic device 2200 may autonomously transmit a magnetic field signal during the autonomous interval without a request from the base station 2100. The base station 2100 may determine a priority level in further consideration of information according to the user interrupt. For example, even though a priority level is higher or lower according to a predetermined algorithm, the priority level may be determined to be higher or lower according to a user request.

When a priority level is set, the base station 2100 performs scheduling for wireless power transmission.

The base station 2100 may schedule the response interval of the superframe for wireless power transmission by using the obtained information.

The base station 2100 may split the response interval of the superframe for power transmission into time slots, and allocate a time slot to the electronic device 2200. Here, the base station 2100 may split the response interval into time slots and allocate the time slots in consideration of priority levels.

The base station 2100 may adjust attributes of time slots in consideration of priority levels. For example, a time slot allocated to an electronic device 2200 having a higher priority level may have a longer time length, and conversely, a time slot allocated to an electronic device 2200 having a lower priority level may have a shorter time length.

The base station 2100 may allocate a time slot in consideration of a priority level. For example, the base station 2100 may allocate a larger number of time slots to an electronic device 2200 having a higher priority level, and conversely, the base station 2100 may allocate a smaller number of time slots to an electronic device 2200 having a lower priority level. If the battery 1250 of any electronic device 2200 is fully charged, the base station 2100 may sense it, evaluate a priority level of the electronic device 2200 as 0, and may not allocate a time slot to the electronic device 2200 during the response period.

Also, in the present invention, several electronic devices 2200 may be simultaneously allocated to a single time slot, and here, an electronic device 2200 having a higher priority level may monopolize a time slot, while electronic devices 2200 having a lower priority level may share a single time slot.

According to this scheduling, the base station 2100 may preferentially supply power to the electronic device 2200 having a higher priority level over the electronic device 2200 having a lower priority level.

The base station 2100 wirelessly supplies power to the electronic device 2200 according to scheduling (S4500). The step (S4500) of wirelessly supplying power may be performed in a manner identical or similar to the step S2500 of wirelessly supplying power in the wireless power transmission method according to another embodiment of the present invention described above, and thus, a difference from the step S2500 will be largely described briefly.

The base station 2100 transmits a power transfer ready request packet including time slot allocation information according to scheduling during the request period of the superframe, and the electronic device 2200 receives the power transfer ready request packet and is allocated a time slot. The base station 2100 transmits a magnetic field signal for power transmission to the electronic device 2200. The electronic device 2200 may be activated to receive power during an allocated time slot of the response interval and deactivated not to receive power during an unallocated time slot. This may correspond to steps S2510 and S2550 of FIG. 9.

In the wireless power transmission method described above, all of the steps described above are not essential, and thus, the wireless power transmission method may be performed with some steps omitted, and since the steps described above are not necessarily performed in the described order, and thus, step described later may be performed before a step described first.

The foregoing embodiments and advantages are merely exemplary and are not to be considered as limiting the present disclosure. It will be apparent to those skilled in the art that modifications and variations can be made without departing from the spirit and scope of the invention.

This description is intended to be illustrative, and not to limit the scope of the claims. Also, although an embodiment has not been described in the above disclosure, it should be extensively construed within the scope of the technical concept defined in the claims. And, various changes and modifications that fall within the scope of the claims, or equivalents of such scope are therefore intended to be embraced by the appended claims

DESCRIPTION OF REFERENCE NUMERALS

1000: wireless power transfer system
1100: transmission device
1110: first antenna
1120: power conversion module
1130: first communication module
1140: first control module
1200: reception device
1210: second antenna
1220: power management module
1230: second communication module
1240: second control module
1250: battery
2000: WPTN
2100: base station node
2200: electronic device node
R: power source
Zp: charging zone
Zc: communication zone

MODE FOR INVENTION

The mode for practicing the present invention is the same as the best mode for practicing the present invention described above.

INDUSTRIAL APPLICABILITY

When the present invention is used, wireless power transmission may be performed such that power is wirelessly transmitted using a magnetic field and in-band communication is performed through the magnetic field used for wireless power transmission.

Also, by recognizing whether an electronic device is within a charging zone through in-band communication, a time slot may be allocated to the electronic device within the charging zone and a time slot is not allocated to an electronic device not within the charging zone, thus effectively performing wireless power transmission.

Also, a base station may obtain information regarding an electronic device through in-band communication and split a response interval into time slots and allocates the time slots by using the information, whereby power can be effectively transmitted to a plurality of electronic devices.

Also, according to priority levels determined on the basis of information regarding electronic devices, power is preferentially supplied to an electronic device having a higher priority level to first charge the electronic device which needs to be urgently charged over an electronic device which does not need to be urgently charged, thus enhancing user convenience.

What is claimed is:

1. A wireless power transmission method, performed by a controller in a base station in a wireless power transfer network which performs wireless power transmission by using a magnetic field and in-band communication using the magnetic field, and includes the base station supplying power and a plurality of electronic devices receiving power, the wireless power transmission method comprising:
   transmitting a request packet as a magnetic field signal;
   receiving response packets transmitted as magnetic field signals from the plurality of electronic devices which have received the request packet;
   recognizing the plurality of electronic devices on the basis of the received response packets;
   splitting a power transmission interval into a plurality of time slots by using the recognition result, and allocating at least one electronic device to each time slot; and
   transferring power by using a magnetic field to an electronic device allocated to a corresponding time slot in each of the plurality of time slots during the power transmission interval,
   wherein the response packets include information regarding characteristics of the plurality of electronic devices, and
   wherein the power transmission interval is split into a plurality of time slots and the plurality of time slots are allocated by using the information regarding the characteristics of the plurality of electronic devices.

2. The wireless power transmission method of claim 1, wherein, in the allocating of at least one electronic device, the power transmission interval is split into a plurality of time slots and the plurality of time slots are allocated by using characteristics of the plurality of electronic devices according to the recognition result.

3. The wireless power transmission method of claim 2, wherein, in the allocating of at least one electronic device, electronic devices having similar characteristics, among the plurality of electronic devices, are allocated to the same time slot.

4. The wireless power transmission method of claim 2 or 3, wherein the characteristics of the plurality of electronic devices include at least one among a rated voltage, a battery state, types of electronic devices, locations of electronic devices, transmission efficiency, and a transmission gain.

5. A wireless power transmission method, performed by a controller in a base station in a wireless power transfer network which performs wireless power transmission by using a magnetic field and in-band communication using the magnetic field, and includes the base station supplying power and a plurality of electronic devices receiving power, the wireless power transmission method comprising:

recognizing the plurality of electronic devices through the in-band communication;

splitting a power transmission interval into a plurality of time slots by using a result of the recognizing, and allocating at least one electronic device to each time slot;

transmitting a request packet including the time slot allocation information; and transferring power by using a magnetic field to an electronic device allocated to a corresponding time slot in each of the plurality of time slots during the power transmission interval, wherein each of the plurality of electronic devices is activated during the allocated time slot and deactivated during an unallocated time slot by using the time slot allocation information.

6. A wireless power transmission method, performed by a controller in a base station in a wireless power transfer network which performs wireless power transmission by using a magnetic field and in-band communication using the magnetic field, and includes the base station supplying power and a plurality of electronic devices receiving power, the wireless power transmission method comprising:

transmitting a request packet requesting information of the plurality of electronic devices to the plurality of electronic devices;

receiving response packets with respect to the request packet from the plurality of electronic devices;

determining priority levels of the plurality of electronic devices;

performing scheduling of at least one time slot by splitting a power transmission interval on the basis of the priority levels; and supplying power to the plurality of electronic devices by using the magnetic field, wherein, the priority levels are determined on the basis of the information of the plurality of electronic devices included in the response packets.

7. A wireless power transmission method, performed by a controller in a base station in a wireless power transfer network which performs wireless power transmission by using a magnetic field signal and in-band communication using the magnetic field signal, the wireless power transmission method comprising:

transmitting a first packet including first time slot allocation information indicating a time slot allocated to each electronic device by using a frame structure including a plurality of time slots;

receiving a second packet from an electronic device during a corresponding time slot of the plurality of time slots which is allocated to the electronic device; and transmitting a third packet including second time slot allocation information by the frame structure based on the second packet, wherein the second packet includes information regarding characteristic of the magnetic field signal.

8. The wireless power transmission method of claim 7, wherein the fame structure includes a request interval, a response interval, and an autonomous interval.

9. The wireless power transmission method of claim 7, wherein the characteristics of the magnetic field signal comprises at least one among strength, an amplitude, and a frequency of the magnetic field signal.

10. A wireless power reception method, performed by a controller in an electronic device in a wireless power transfer network which performs wireless power reception by using a magnetic field signal and in-band communication using the magnetic field signal, the wireless power reception method comprising:

receiving, from a base station, a first packet including first time slot allocation information indicating a time slot allocated to each electronic device by using a frame structure including a plurality of time slots;

transmitting, to the base station, a second packet during a corresponding time slot of the plurality of time slots; and receiving, from the base station, a third packet including second time slot allocation information by the frame structure based on the second packet, wherein the second packet includes information regarding characteristic of the magnetic field signal.

11. The wireless power reception method of claim 10, wherein the fame structure includes a request interval, a response interval, and an autonomous interval.

12. The wireless power reception method of claim 10, wherein the characteristics of the magnetic field signal comprises at least one among strength, an amplitude, and a frequency of the magnetic field signal.

* * * * *